United States Patent
Biss et al.

(10) Patent No.: US 11,698,143 B2
(45) Date of Patent: Jul. 11, 2023

(54) SOLENOID VALVE WITH PERMANENT MAGNETS

(71) Applicant: Marotta Controls, Inc., Montville, NJ (US)

(72) Inventors: Andrew Biss, Montville, NJ (US); Alexander Colletti, Montville, NJ (US); Christopher Strianse, Montville, NJ (US)

(73) Assignee: Marotta Controls, Inc., Montville, NJ (US)

( * ) Notice: Subject to any disclaimer, the term of this patent is extended or adjusted under 35 U.S.C. 154(b) by 126 days.

(21) Appl. No.: 17/198,832

(22) Filed: Mar. 11, 2021

(65) Prior Publication Data
US 2022/0290773 A1    Sep. 15, 2022

(51) Int. Cl.
*F16K 31/08*    (2006.01)
*F16K 31/06*    (2006.01)

(52) U.S. Cl.
CPC ........ *F16K 31/0675* (2013.01); *F16K 31/082* (2013.01); *F16K 31/084* (2013.01); *F16K 31/08* (2013.01)

(58) Field of Classification Search
CPC .... F16K 31/0675; F16K 31/08; F16K 31/082; F16K 31/084
USPC ......................................................... 251/65
See application file for complete search history.

(56) References Cited

U.S. PATENT DOCUMENTS

| | | | | |
|---|---|---|---|---|
| 3,305,209 A * | 2/1967 | Bender | ............... | F15B 13/0402 335/229 |
| 3,809,123 A * | 5/1974 | Heimann | ............... | F16K 31/082 137/625.5 |
| 3,889,219 A * | 6/1975 | Larner | .................... | F16K 35/16 335/253 |
| 5,111,092 A * | 5/1992 | Reinicke | .................. | G01D 5/14 310/68 B |
| 5,375,811 A * | 12/1994 | Reinicke | ............... | F16K 31/082 137/550 |
| 6,068,010 A * | 5/2000 | Reinicke | ................... | F15C 5/00 251/129.21 |
| 6,386,505 B2 * | 5/2002 | Schob | .................... | F16K 31/082 251/7 |
| 8,540,208 B2 * | 9/2013 | Alvarez | ............... | F16K 31/0658 251/129.21 |
| 9,530,552 B1 | 12/2016 | Shen et al. | | |
| 9,702,477 B1 * | 7/2017 | Robertson | ........... | F16K 31/0606 |
| 10,190,698 B2 * | 1/2019 | Colletti | ............... | F16K 31/0613 |
| 10,190,702 B2 * | 1/2019 | Fuller | ................. | F16K 99/0046 |

(Continued)

FOREIGN PATENT DOCUMENTS

DE    102008063689 A1    7/2010
EP          0876669 A1    11/1998

*Primary Examiner* — Matthew W Jellett
(74) *Attorney, Agent, or Firm* — Lerner David LLP

(57) ABSTRACT

A latching assembly for a solenoid operated valve includes a solenoid assembly including a core defining a bore extending along an axis, and a coil mounted to the core and disposed about the axis. The solenoid operated valve further includes an armature assembly including an armature stud disposed at least partially within the bore and extending along the axis, an armature disc disposed radially about a portion of the armature stud and defining at least one window, and at least one stationary magnet respectively disposed within the at least one window.

20 Claims, 7 Drawing Sheets

(56) References Cited

U.S. PATENT DOCUMENTS 10,760,702 B2 * 9/2020 Fuller .................. F16K 31/082
11,022,231 B2 * 6/2021 Wolfinger ............... H01F 7/081

* cited by examiner

SOLENOID VALVE WITH PERMANENT MAGNETS

BACKGROUND

The present disclosure generally relates to solenoid operated valves, and more particularly to solenoid operated valves having permanent magnets connected to an armature to enable movement and latching of the armature.

Solenoid operated valves are useful in many industrial applications and offer a number of advantages over traditional mechanical valves. Operation of a solenoid valve includes movement of an armature via selectively running current through a solenoid coil to cause the armature to displace other elements within the valve to open or close fluid communication between fluid channels. Known solenoid valves typically require sustained current through the coil to hold the armature in a certain position. Such solenoid valves can therefore consume a significant quantity of energy throughout their operation, and may need to remain energized even when other aspects of the system in which the valve is implemented are dormant.

There remains room for improvement in the design and use of solenoid operated valves, particularly with regard to the energy requirements of such valves.

BRIEF SUMMARY

According to an aspect of the disclosure, a solenoid valve unit may have a bistable design wherein an armature of the unit may be configured to remain passively latched in either of two positions in the absence of any energy supplied to the unit. The armature may include permanent or stationary magnets, and the bistable latching may be achieved by attraction of the permanent magnets to ferromagnetic elements or permanent magnets that are mounted at fixed positions relative to a remainder of the unit on opposite sides of the permanent magnets. The permanent magnets may be retained in a disc component of the armature at a location of the armature beyond an axial end of a solenoid provided by windings around a core. The ferromagnetic elements may include the core and a yoke on an opposite side of the disc from the core.

The magnets may be retained within the disc on a plane normal to a central axis of the solenoid coil. The north and south pole of each magnet may also lie on the plane. The magnets may be retained in a circular arrangement centered on the central axis.

According to another aspect, a latching assembly for a solenoid operated valve may comprise a solenoid assembly including a core defining a bore extending along an axis, and a coil mounted to the core and disposed about the axis. The assembly may further comprise an armature assembly including an armature stud disposed at least partially within the bore and extending along the axis, an armature disc disposed radially about a portion of the armature stud and defining at least one window, and at least one stationary magnet respectively disposed within the at least one window.

In another arrangement according to any of the foregoing, each of the at least one stationary magnets may be oriented such that poles of the magnet lies on a transverse plane normal to the axis.

In another arrangement according to any of the foregoing, each of the at least one stationary magnets may include poles aligned along a pole axis that intersects the axis along which the bore extends.

In another arrangement according to any of the foregoing, the armature assembly may not be connected to a power supply at any position within the valve.

In another arrangement according to any of the foregoing, the at least one window of the armature disc may be a plurality of windows, and the at least one stationary magnet may be a plurality of stationary magnets retained by the plurality of windows of the armature disc, respectively, in a ring shape lying on a plane normal to the axis.

In another arrangement according to any of the foregoing, each magnet in the plurality of stationary magnets may be oriented with its poles directed in radial directions relative to the axis.

In another arrangement according to any of the foregoing, the plurality of stationary magnets is six stationary magnets.

In another arrangement according to any of the foregoing, each stationary magnet of the plurality of stationary magnets may be cubic in shape.

In another arrangement according to any of the foregoing, each magnet of the plurality of stationary magnets may be 0.25 inches in length, height, and width.

In another arrangement according to any of the foregoing, the valve may further comprise a yoke constructed of a magnetic metal or a permanent magnet and located axially adjacent to the armature disc.

In another arrangement according to any of the foregoing, the yoke may be located on an opposite side of the disc from the armature coil.

In another arrangement according to any of the foregoing, the armature disc may be spring biased toward the yoke.

In another arrangement according to any of the foregoing, the valve may further comprise a non-magnetic snubber located axially adjacent to the armature disc and preventing contact between the disc and the yoke.

In another arrangement according to any of the foregoing, the snubber may be an annular structure that is centered on the axis and extends to an axial location between the yoke and the disc.

In another arrangement according to any of the foregoing, the at least one window of the armature disc may be a plurality of windows, and a spoke is defined between each pair of adjacent windows, each spoke extending radially from the axis.

In another arrangement according to any of the foregoing, a solenoid valve may comprise a valve portion. The valve portion may include a valve block defining a lumen, an annular seat within the lumen, and an elongate poppet slidably disposed within the lumen. The poppet may include an annular shelf. The poppet may be biased within the lumen toward a sealing position at which the shelf seals against the seat to cut off fluid communication between portions of the lumen on opposite sides of the seat. The valve block may be connected to the solenoid assembly such that the poppet may travel to the sealing position when the armature assembly is in a closed position, and travel of the armature assembly to an open position forces the poppet out of the sealing position.

In another aspect, a method of operating any of the foregoing arrangements may include energizing the coil to create a first coil force that is greater in magnitude than a first magnetic force defined by a magnetic attraction between the at least one magnet and the yoke to pull the armature disc away from the yoke and open a fluid channel within the valve.

In another arrangement according to any of the foregoing, the step of energizing the coil may include providing an electrical pulse to the coil to create the first coil force.

In another arrangement according to any of the foregoing, the method may further comprise de-energizing the coil and allowing a second magnetic force defined by a magnetic attraction between the at least one magnet and the core to hold the armature disc against the core.

In another arrangement according to any of the foregoing, the method may further comprise energizing the coil by reversing current through the coil to create a second coil force that is greater than the second magnetic force to drive the armature disc to move toward the yoke and close the fluid channel.

In another arrangement according to any of the foregoing, the step of energizing the coil to create the second coil force may include providing an electrical pulse to the coil.

DETAILED DESCRIPTION

Figure 1:
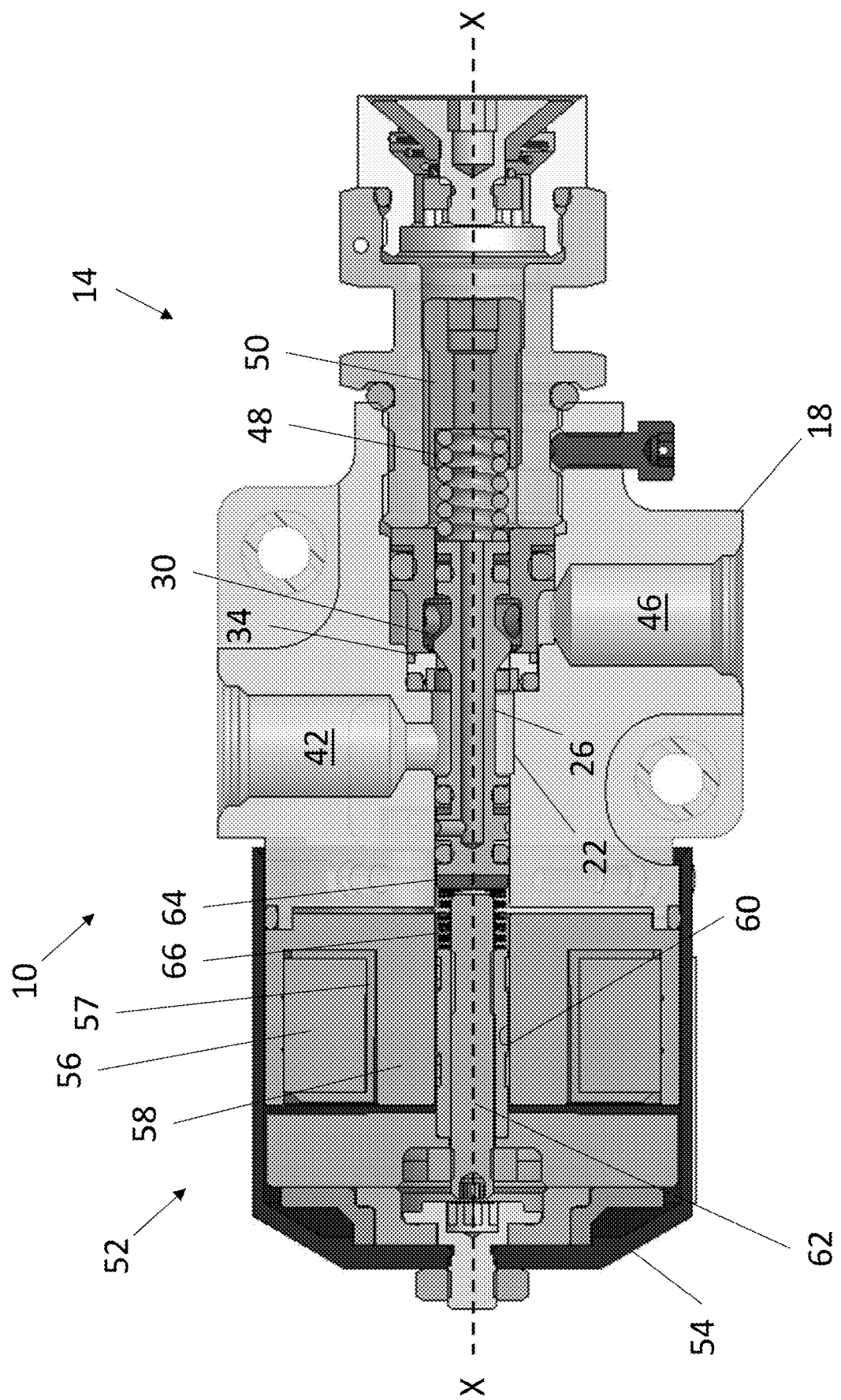
FIG. 1 is a sectional plan view of a solenoid operated valve in accordance with a first arrangement.

FIG. 1 illustrates an exemplary arrangement of a solenoid operated valve unit 10 in accordance with the present invention. Unit 10 includes a valve portion 14 that includes a valve block 18, a lumen 22 extending through valve block 18 along a central axis X of unit 10, and a poppet 26 slidably disposed within lumen 22.

Poppet 26 includes an annular shelf 30 of greater diameter than an adjacent region of poppet 26. Disposed within lumen 22 is an annular seat 34. Poppet 26 is located within lumen 22 such that shelf 30 is near seat 34, and such that poppet 26 may travel to either provide a space between shelf 30 and seat 34, or to press shelf 30 against seat 34 to seal off portions of lumen 22 on opposite sides of seat 34 from one another. A first fluid channel 42 and a second fluid channel 46 each extend into valve block 18 and into fluid communication with a respective one of said portions of lumen 22 on opposite sides of seat 34. Positioning of poppet 26 such that shelf 30 presses against seat 34 therefore seals first fluid channel 42 from second fluid channel 46, while positioning poppet 26 such that shelf 30 does not contact seat 34 puts first fluid channel 42 into fluid communication with second fluid channel Either of first fluid channel 42 and second fluid channel 46 may be an inlet while the other is an outlet, so the sliding disposition of poppet 26 within lumen 22 of valve block 18 enables valve portion 14 to selectively enable or prevent fluid flow through unit 10. In other embodiments, additional seats can be provided for communication with the opposite side of shelf 30, and additional inlets and/or outlets can also be provided.

In the illustrated arrangement, a poppet spring 48 is disposed at an end of poppet 26 from seat 34 relative to shelf 30. Poppet spring 48 is compressed between said end of poppet 26 and an adjustment screw 50 disposed within lumen 22, and therefore biases shelf 30 of poppet 26 toward seat 34. Poppet spring 48 thus biases poppet 26 toward a sealing position at which poppet 26 seals first channel 42 from second channel 46 in the absence of an opposing force to overcome the bias provided by poppet spring 48. The magnitude of the bias provided by poppet spring 48 on poppet 26 can be adjusted by turning adjustment screw 50 relative to its threaded connection to valve block 18, thereby causing poppet spring 48 to travel along axis X. Such travel of adjustment screw 50 changes a distance between poppet spring's 48 point of contact on adjustment screw 50 and seat 34, making both the sealing and non-sealing positions of poppet 26 correspond to different degrees of compression of poppet spring 48. In alternative arrangements, however, shelf 30, seat 34, and poppet spring 48 may be located differently relative to one another and poppet 26 such that poppet spring 48 biases seat 34 away from shelf 30. In any of the foregoing arrangement, poppet spring 48 may be replaced with functionally similar biasing devices. In yet further arrangements, valve portion 14 may lack any poppet spring 48 or other device for biasing poppet 26 and poppet's 26 position within lumen 22 may be governed entirely by features of a solenoid portion 52 of unit 10.

Solenoid portion 52 includes a housing 54 connected at a fixed position to valve block 18. Mounted within housing 54 is a core 58, with windings 56 and a bobbin 57 disposed around core 58 and centered about central axis X. A bore 60 extends along central axis X through core 58 to an end of lumen 22. A widened end of poppet 26 nearest solenoid portion 52 seals lumen 22 so that no fluid escapes lumen 22 into solenoid portion 52 or bore 60. A poppet disc 64 is disposed on the widened end of poppet 26 and acts to bear impacts by armature 62, but may be omitted in certain alternative arrangements. For additional details regarding features and implementation of a similar poppet disc, reference may be made to U.S. Pat. No. 10,190,698, granted Jan. 29, 2019, the entirety of which is incorporated by reference herein. A portion of an armature 62, specifically stud 65, is slidably disposed within bore 60 and can be impelled to travel along bore 60 by energizing windings 56. Windings 56 can therefore selectively be energized to drive armature 62 to apply force to poppet 26 either directly or, as in the illustrated arrangement, through poppet disc 64.

Figure 2A:
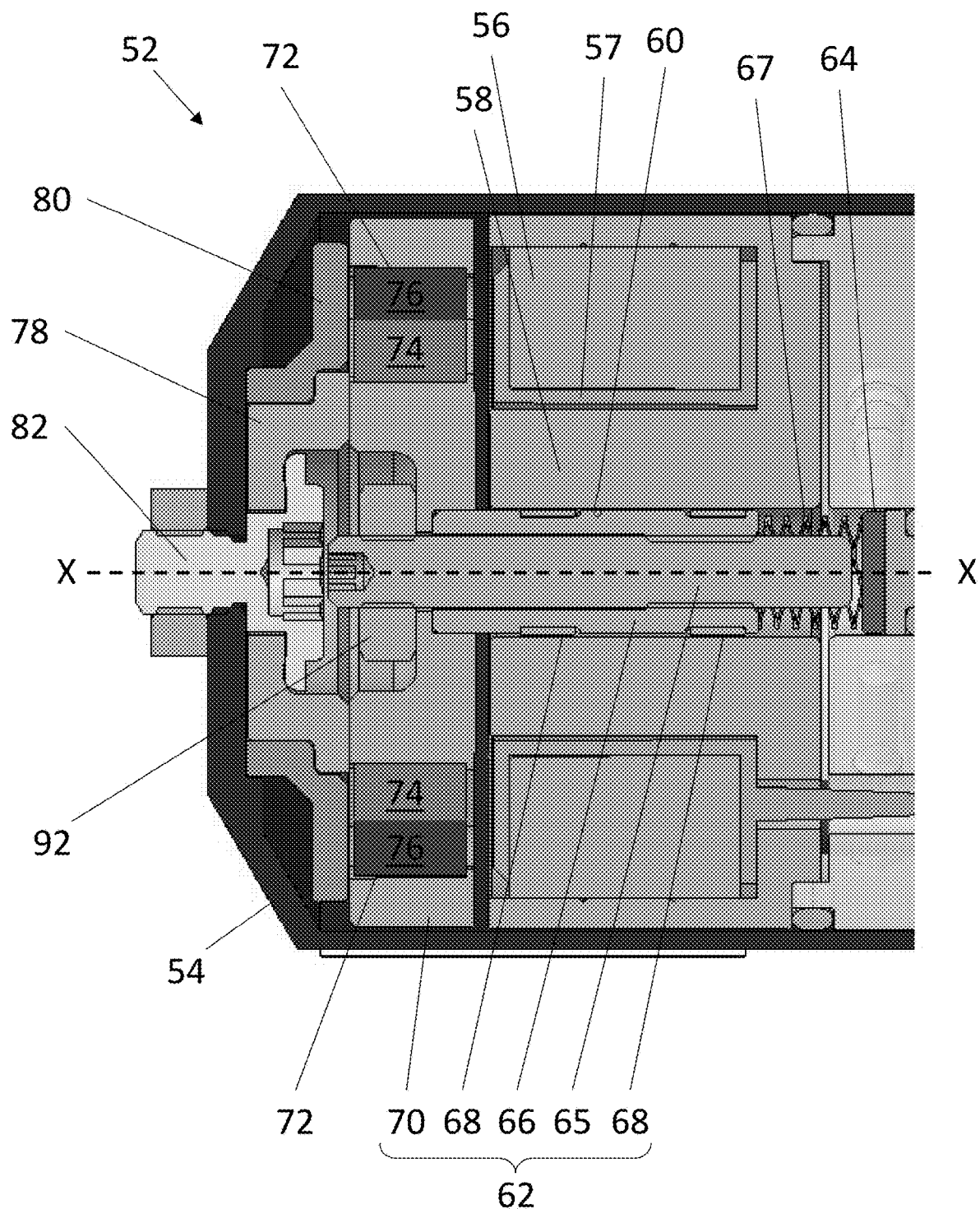
FIG. 2A is a sectional plan view of a solenoid portion of the valve of FIG. 1 in a closed position.
Figure 2B:
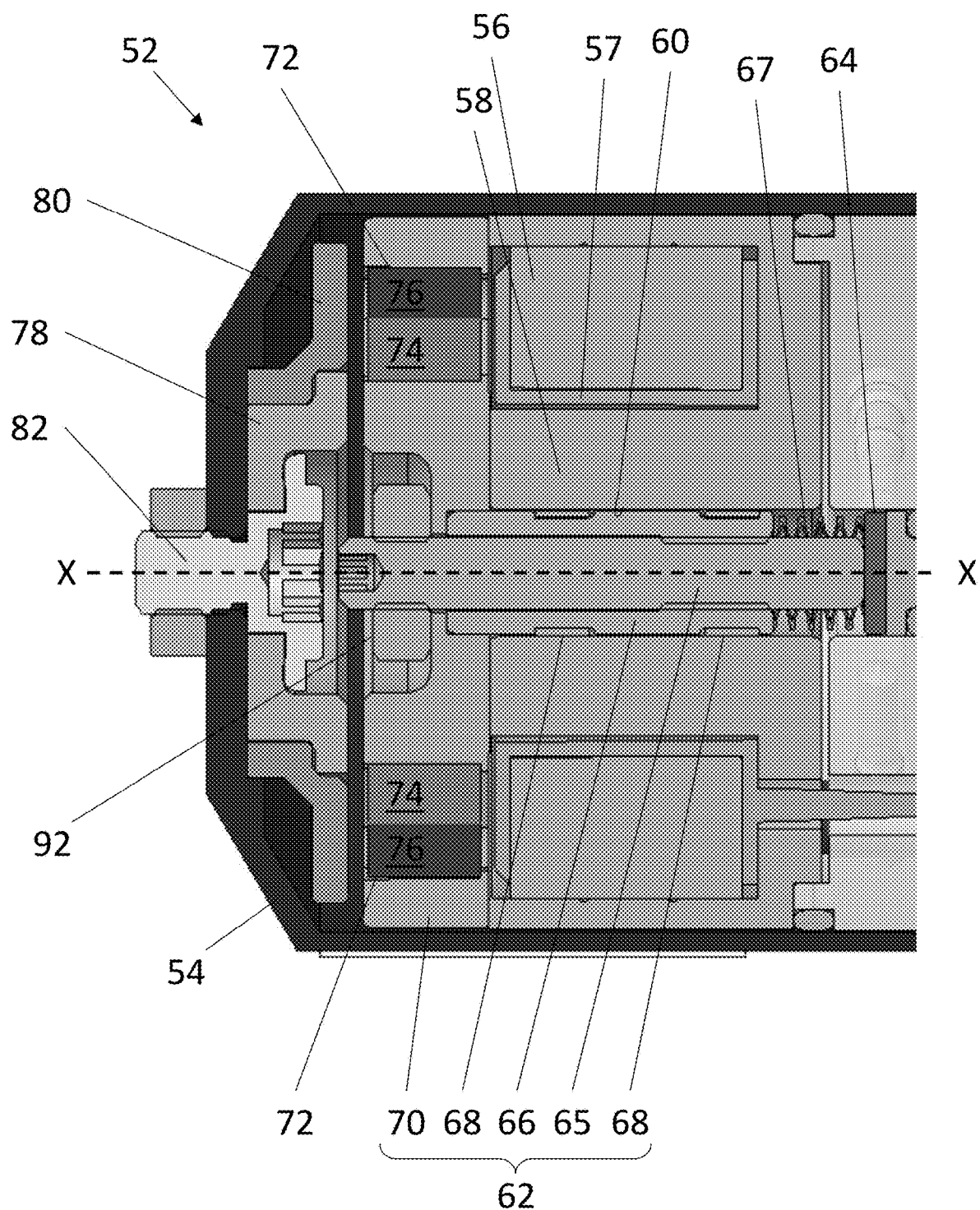
FIG. 2B is a sectional plan view of the solenoid portion of FIG. 2A of the valve of FIG. 1 in an open position.

Turning to FIGS. 2A and 2B, armature 62 includes a stud 65 that extends along central axis X, a sleeve 66 enclosing a length of stud 65, and low-friction rings 68 seated into sleeve 66 to prevent wear upon either an exterior surface of sleeve 66 or an interior surface of bore 60 upon the other. However, in alternative arrangements, either or both of sleeve 66 and rings 68 may be absent, sleeve 66 may be integral with stud 65, or rings 68 may be integral with either sleeve 66 or stud 65.

Armature 62 further includes a disc 70 translationally fixed to stud 65 at a location outside of core 58. Permanent magnets 72, which may also be referred to as "stationary magnets," are seated within disc 70 such that a first pole 74 and a second pole 76 lie on a plane transverse, and more specifically normal in the illustrated example, to central axis X. Permanent magnets 72 may be, for example, rare earth magnets, with neodymium magnets being a specific example, and may be plated with a suitable metal, alloy, or resin, with nickel and epoxy being specific examples. Permanent magnets 72 of the illustrated arrangement are cubic, being 0.25 inches in width, length, and height, but permanent magnets in other arrangements may differ in geometry and size. Either first poles 74 or second poles 76 may be south poles of their respective permanent magnets 72, while the other of first poles 74 and second poles 76 are north poles. Regardless, each permanent magnet 72 seated within disc 70 is oriented such that the first pole 74 is directed toward stud 65, or radially inward to intersect central axis X, while each second pole 76 is directed away from stud 65, or radially outward such that it would extend to intersect central axis X. Thus, permanent magnets 72 are arranged either such that the north pole of each magnet faces radially outward while the south poles face radially inward, or such that the north pole of each magnet faces radially inward while the south poles face radially outward. Such orientation of permanent magnets 72 within disc 70 enables magnetic fields of permanent magnets 72 to cooperate with a field generated by energizing windings 56. Permanent magnets 72 thus aid in pulling disc 70 toward core 58 or pushing disc 70 away from core 58 depending on a direction of current through windings 56. Because disc 70 is translationally fixed to stud 65, permanent magnets 72 also aid in directing movement of stud 65 of armature 62 within bore 60 along central axis X.

Armature 62 is movable between an open position, shown in FIG. 2A, wherein permanent magnets 72 hold disc 70 against core 58, and a closed position, shown in FIG. 2B, wherein permanent magnets 72 hold disc 70 against a snubber 78 located on an opposite side of disc 70 from core 58. In the illustrated example, a distance of travel between the open position and the closed position is in a range of 0.02-0.04 inches, or more specifically equal to or about 0.029 inches, and disc 70 is separated from windings 56 by equal to or about 0.001 inches when in the closed position. However, alternative arrangements of the unit 10 may be at any scale, and may therefore have a larger or smaller distance between the open position and the closed position or a larger or smaller separation between windings 56 and disc 70. As used herein, approximate language such as "about" or "approximately" with regard to a numerical value refers to any values greater or less than the stated value by up to 15%. Snubber 78 is formed of a non-magnetic material such as rigid polymer, with polyimide, PEEK (Polyetheretherketone), PTFE (Polytetrafluoroethylene), and FEP (Fluorinated ethylene propylene) being specific, though non-limiting, examples. Glass-filled and carbon-filled versions of these materials can also be utilized. Disc 70 is held against snubber 78 in the closed position by attraction of permanent magnets 72 to a yoke 80. Yoke 80 is made of a magnetic material such as a permanent magnet or a ferromagnetic metal or alloy, with carbon steel 1215 being a specific example. Both snubber 78 and yoke 80 are retained to housing 54 by a bolt 82. Yoke 80 and snubber 78 have annular shapes, with snubber 78 being shaped and sized to encircle yoke 80. Yoke 80 and snubber 78 are respectively formed such that, when both are arranged concentrically on bolt 82 and bolt 82 is threaded into a receiving hole in housing 54 as shown in both FIGS. 2A and 2B, a head of bolt 82 holds yoke 80 and snubber 78 to an interior surface of an end of housing 54, and snubber 78 extends axially beyond yoke 80 toward core 58. Snubber 78 therefore prevents disc 70 from directly contacting yoke 80 in any position. A gap between yoke 80 and disc 70 in the closed position as provided by snubber 78 may be, for example, in a range of 0.002-0.005 inches. In the illustrated example, the gap between yoke 80 and disc 70 in the closed position is equal to an axial distance toward valve portion 14 that snubber 78 extends beyond yoke 80.

In the closed position shown in FIG. 2A, poppet spring 48 pushes poppet 26 toward solenoid portion 52 until shelf 30 seals against seat 34 to cut off fluid communication between first fluid channel 42 and second fluid channel 46. When the solenoid is energized to move armature 62 into the open position shown in FIG. 2B, armature 62 forces poppet 26 axially away from solenoid portion 52 such that shelf 30 is out of contact with seat 34, thus permitting fluid communication between first fluid channel 42 and second fluid channel 46.

In the illustrated example, a stud spring 67 is disposed such that a first and second of its axially opposite ends respectively contact sleeve 66 and poppet disc 64. Stud spring 67 biases armature 62 away from poppet 26 enough to reduce a force necessary to move armature 62 from the open position to the closed position. However, stud spring 67 has an elastic modulus too low to dislodge armature 52 from the open position or poppet 26 from the closed position on its own. In alternative arrangements, stud spring 67 may be otherwise located and seated while still biasing armature 52 away from poppet 26, may be replaced by a different biasing element, or may be omitted.

Figure 3A:
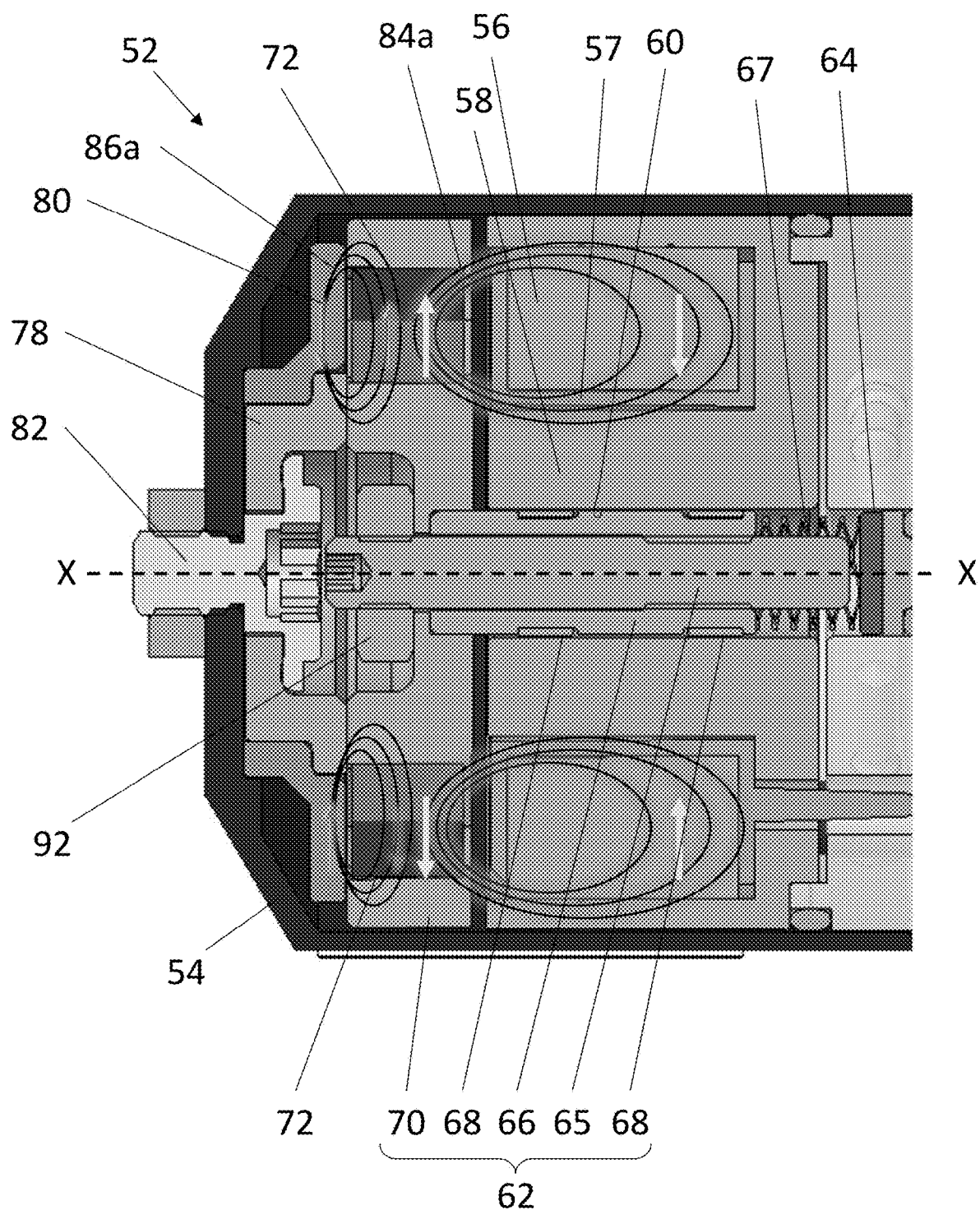
FIGS. 3A and 3B are the sectional plan views of FIGS. 2A and 2B, respectively, with first and second magnetic flux interactions, respectively, illustrated thereon.
Figure 3B:
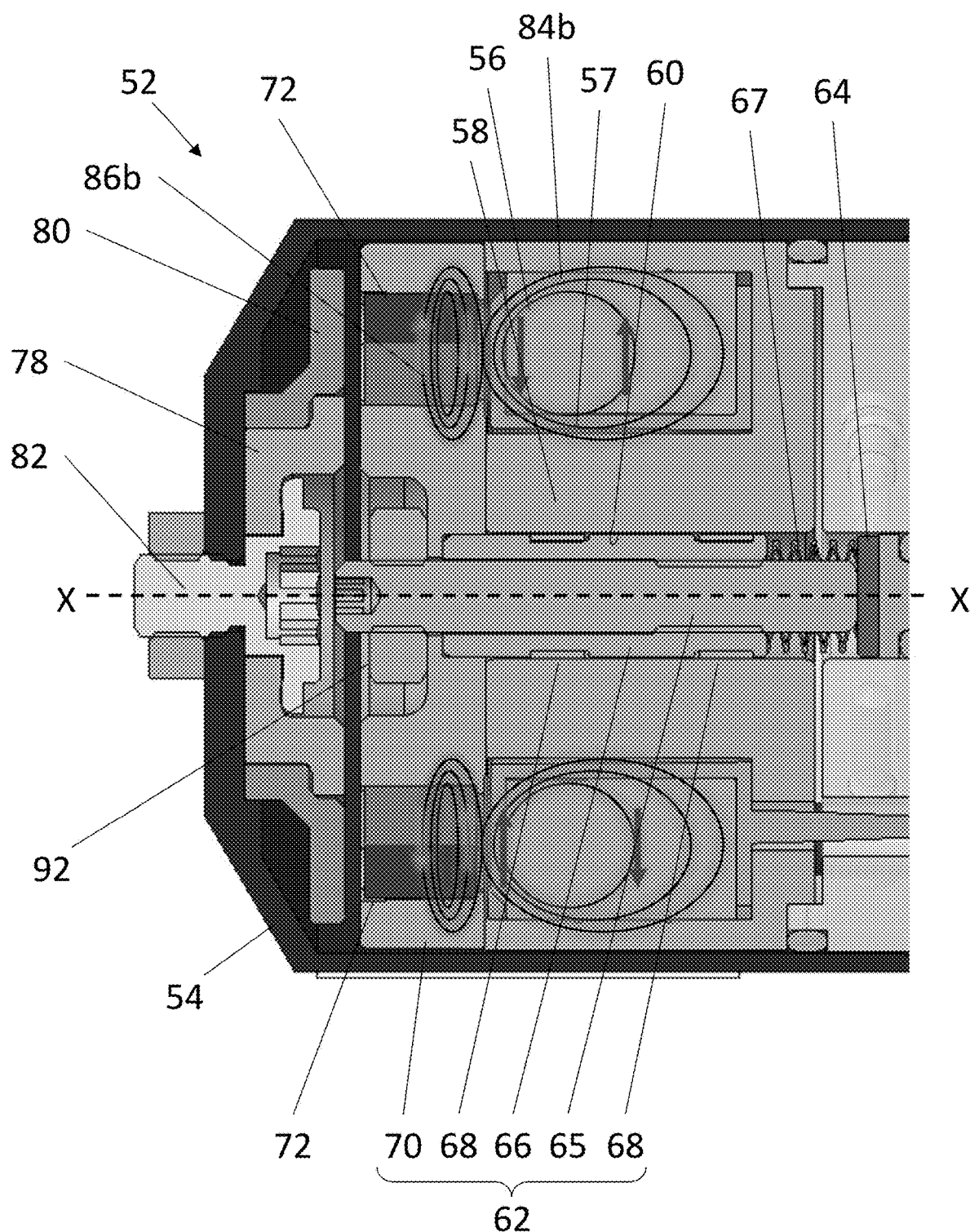

Biasing elements within unit 10, relative locations of various features, and a collective strength of permanent magnets 72 are balanced such that armature 62 is bistable, meaning armature 62 will remain in either the open position or closed position until windings 56 are energized. Armature 62 can therefore be moved between the open position and the closed position by sending a brief pulse of current through windings 56 in the correct direction. Armature 62 is not operatively connected to any power supply in the open position, the closed position, or any position therebetween. For example, FIG. 3A shows interaction of a pull flux 84a generated by energizing windings 56 in a first direction interacting with a first permanent magnet flux component 86a to draw armature 62 from the closed position, wherein disc 70 abuts snubber 78 as shown, to the open position. To open fluid communication between first channel 42 and second channel 46, a magnitude and a duration of a pulse of current through windings 56 in the first direction need only be great enough to pull armature 70 until attraction between permanent magnets 72 and core 58 becomes great enough to exceed all forces urging armature 70 toward the closed position, including bias from stud spring 67 and attraction of permanent magnets 72 to yoke 80, beyond which point permanent magnets 72 will latch armature 70 in the open position without further input. Similarly, FIG. 3B shows interaction of a push flux 84b generated by energizing windings 56 in a second direction, opposite to the first direction, interacting with a second permanent magnet flux component 86b to drive armature from the open position, wherein disc 70 abuts core 58 as shown, toward the closed position. To close fluid communication between first channel 42 and second channel 46, a magnitude and duration of a pulse of current through windings 56 in the second direction need only be great enough to push armature 70 until forces driving armature 70 toward the closed position exceed attraction between permanent magnets 72 and core 58, at which point permanent magnets 72 will latch armature 70 in the closed position without further input. These pulses may be, for example, equal to or about 75 milliseconds.

Figure 4:
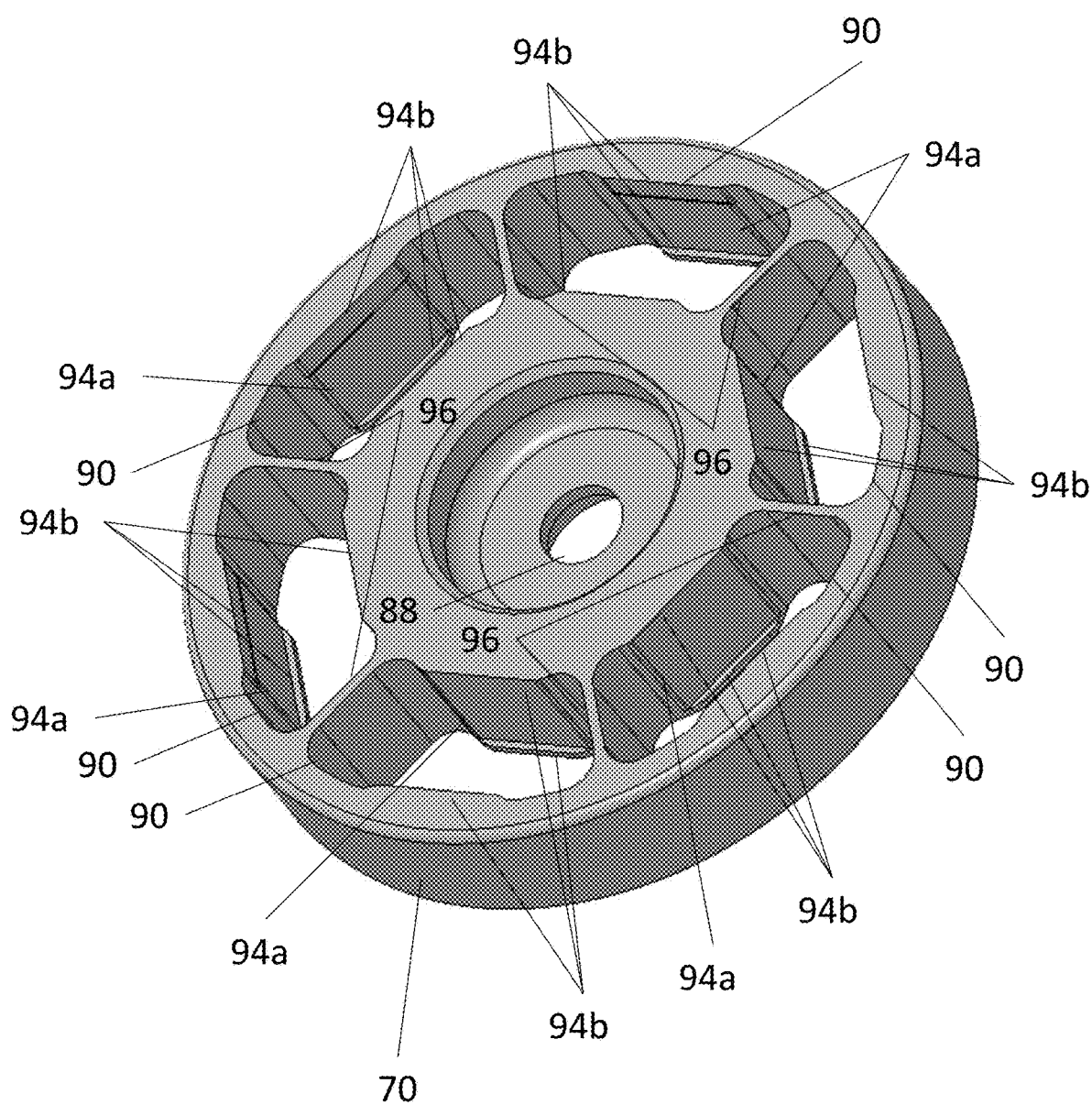
FIG. 4 is a perspective view of a disc of an armature of the solenoid operated valve of FIG. 1 isolated from other components of the solenoid operated valve.
Figure 5:
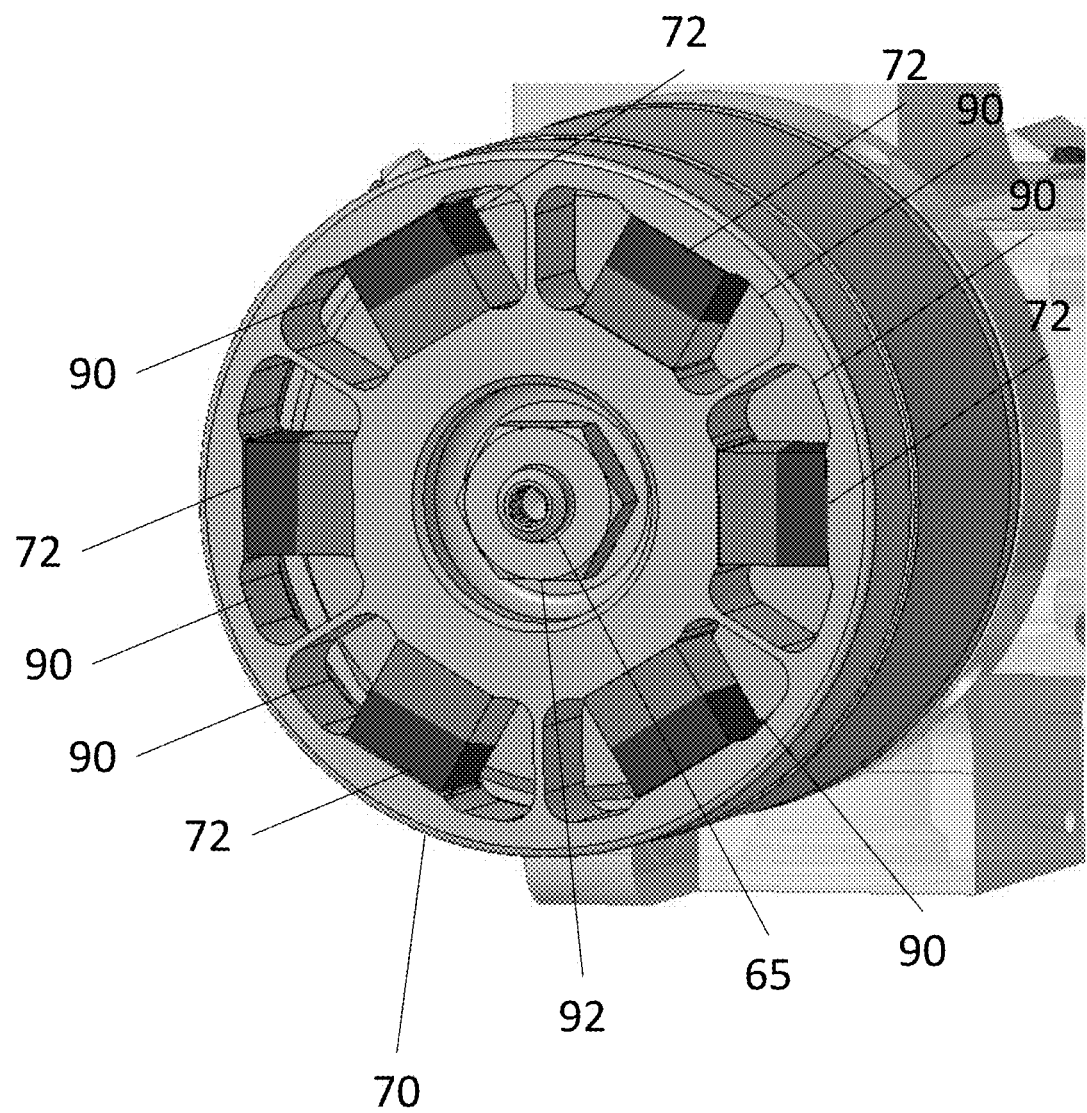
FIG. 5 is a perspective view of the solenoid operated valve with a housing thereof and certain elements mounted to the housing removed from the solenoid operated valve.

FIG. 4 illustrates disc 70 separate from other components of unit 10. Disc 70 includes several windows 90 arranged in a circle around a stud hole 88 and separated by radially extending spokes 96. Two opposed platforms 94a extend into each window 90, and a rib 94b protrudes from each axial end of each platform 94a. Platforms 94a and ribs 94b are dimensioned and configured to receive and retain a permanent magnet 72 within each window 90, as shown in FIG. 5, which shows unit 10 fully assembled except for housing 54, snubber 78, yoke 80, and bolt 82. As visible in FIG. 5, windows 90 extend away from non-polar sides of permanent magnets 72 to reduce a proportion of flux of each permanent magnet 72 that extends through disc 70. Such extra space in each window 90 reduces interference by disc 70 with attraction of the permanent magnets to yoke 80 or core 58 and interaction between winding flux 84a, 84b and permanent magnet flux 86a, 86b.

In the illustrated example, a radial distance between center points of opposed platforms 94a within each window 90 is greater than the corresponding distance across permanent magnet 72 by equal to or about 0.001 inches, totaling a value equal to or about 0.251 inches. Further, spokes 96 are equal to or about 0.020 inches thick. However, in alternative arrangements, the size of the distance between opposed platforms 94a relative to the dimensions of permanent magnets 72 may vary, and the thickness of spokes 96 may vary.

Permanent magnet forces, spring bias forces, and magnetic forces generated by activating the solenoid may all vary depending on a size and calibration of a given unit 10 according to the present disclosure. In the illustrated example, latching force, referring to the axial force necessary to dislodge armature 62 from either the open position or the closed position and resulting from a balance of forces on disc 70 when the solenoid is de-energized, may be within the range of 15-30 pounds, or more specifically equal to or about 20 pounds. The latching force of the open position may differ from the latching force of the closed position. The solenoid may be able to apply force in the range of 20-50 pounds, or more specifically equal to or about 40 pounds, to armature 62 by energizing windings 56. Windings 56 may be energized within the range of 4-9 V, or more specifically equal to or about 6 V. Each of the foregoing forces and electric potential differences may vary in alternative arrangements.

Also shown in FIG. 5 is an axial end of stud 65 furthest from valve portion 14 extending through stud hole 88, with disc 70 retained to stud 65 by a nut 92 threaded onto the axial end of stud 65. In the illustrated example, disc 70 includes six windows 90, and is therefore configured to retain six permanent magnets 72, but in other arrangements the number of windows 90 and permanent magnets 72 vary to balance the total magnetic force provided by permanent magnets 72 with dimensions of various features of unit 10 and force provided by stud spring 67 and poppet spring 48.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A latching assembly for a solenoid operated valve, the latching assembly comprising:
   a solenoid assembly including a core defining a bore extending along an axis, and a coil mounted to the core and disposed about the axis; and
   an armature assembly including an armature stud disposed at least partially within the bore and extending along the axis, an armature disc disposed radially about a portion of the armature stud and defining at least one window, at least one stationary magnet respectively disposed within the at least one window, and the at least one window extending away from non-polar sides of the at least one stationary magnet, such that for each window there is space between the window and each of the non-polar sides of the stationary magnet disposed within the window and nowhere does the window contact the non-polar sides of the stationary magnet disposed within the window.

2. The latching assembly of claim 1, wherein each of the at least one stationary magnet is oriented such that poles of the magnet lie on a transverse plane normal to the axis.

3. The latching assembly of claim 1, wherein each of the at least one stationary magnet includes poles aligned along a pole axis that intersects the axis along which the bore extends.

4. The latching assembly of claim 1, wherein the armature assembly is not connected to a power supply at any position within the valve.

5. The latching assembly of claim 1, wherein the at least one window of the armature disc is a plurality of windows, and the at least one stationary magnet is a plurality of stationary magnets retained by the plurality of windows of the armature disc, respectively, in a ring shape lying on a plane normal to the axis.

6. The latching assembly of claim 5, wherein each magnet in the plurality of stationary magnets is oriented with its poles directed in radial directions relative to the axis.

7. The latching assembly of claim 5, wherein the plurality of stationary magnets is six stationary magnets.

8. The latching assembly of claim 5, wherein each stationary magnet of the plurality of stationary magnets is cubic in shape.

9. The latching assembly of claim 8, wherein each stationary magnet of the plurality of stationary magnets is 0.25 inches in length, height, and width.

10. The latching assembly of claim 1, further comprising a yoke constructed of a magnetic metal or a permanent magnet and located axially adjacent to the armature disc.

11. The latching assembly of claim 10, wherein the yoke is located on an opposite side of the disc from the armature coil.

12. A latching assembly for a solenoid operated valve, the latching assembly comprising:
   a solenoid assembly including a core defining a bore extending along an axis, and a coil mounted to the core and disposed about the axis;
   an armature assembly including an armature stud disposed at least partially within the bore and extending along the axis, an armature disc disposed radially about a portion of the armature stud and defining at least one window, and at least one stationary magnet respectively disposed within the at least one window;
   a yoke constructed of a magnetic metal or a permanent magnet and located axially adjacent to the armature disc; and
   a non-magnetic snubber located axially adjacent to the armature disc and preventing contact between the disc and the yoke.

13. The latching assembly of claim 12, wherein the snubber has an annular structure that is centered on the axis and extends to an axial location between the yoke and the disc.

14. The latching assembly of claim 1, wherein the at least one window of the armature disc is a plurality of windows, and a spoke is defined between each pair of adjacent windows, each spoke extending radially from the axis.

15. A solenoid operated valve comprising:
the latching assembly of claim 1; and
a valve portion that includes:
- a valve block defining a lumen;
- an annular seat within the lumen; and
- an elongate poppet slidably disposed within the lumen and including an annular shelf, the elongate poppet being biased within the lumen toward a sealing position at which the annular shelf seals against the seat to cut off fluid communication between portions of the lumen on opposite sides of the seat;

wherein the valve block is connected to the solenoid assembly such that the poppet is configured to travel toward the sealing position when the armature assembly is in a closed position, and travel of the armature assembly to an open position forces the poppet away from the sealing position.

16. A method of operating the latching assembly of claim 11, comprising energizing the coil to create a first coil force that is greater in magnitude than a first magnetic force defined by a magnetic attraction between the at least one magnet and the yoke to pull the armature disc away from the yoke and open a fluid channel within the valve block.

17. The method of claim 16, wherein the step of energizing the coil includes providing an electrical pulse to the coil to create the first coil force.

18. The method of claim 17, further comprising de-energizing the coil and allowing a second magnetic force defined by a magnetic attraction between the at least one magnet and the core to hold the armature disc against the core.

19. The method of claim 18, further comprising energizing the coil by reversing current through the coil to create a second coil force that is greater than the second magnetic force to drive the armature disc to move toward the yoke and close the fluid channel.

20. The method of claim 19, wherein the step of energizing the coil to create the second coil force includes providing an electrical pulse to the coil.

* * * * *